United States Patent
Sensen et al.

(10) Patent No.: US 7,195,471 B2
(45) Date of Patent: Mar. 27, 2007

(54) BLOWING HEAD FOR EXTRUDING FILMS, COMPRISING CLAMPING ELEMENTS CONTAINING DUCTS FOR COOLING AIR

(75) Inventors: Klemens Sensen, Lengerich (DE); Ulrich Meyer, Ibbenbueren (DE)

(73) Assignee: Windmoeller & Hoelscher KG, Lengerich (DE)

(*) Notice: Subject to any disclaimer, the term of this patent is extended or adjusted under 35 U.S.C. 154(b) by 0 days.

(21) Appl. No.: 10/502,060

(22) PCT Filed: Jan. 21, 2003

(86) PCT No.: PCT/EP03/00564

§ 371 (c)(1),
(2), (4) Date: Aug. 2, 2004

(87) PCT Pub. No.: WO03/066315

PCT Pub. Date: Aug. 14, 2003

(65) Prior Publication Data

US 2005/0129797 A1    Jun. 16, 2005

(30) Foreign Application Priority Data

Feb. 6, 2002    (DE) ............................. 102 04 897

(51) Int. Cl.
*B29C 47/88* (2006.01)
*B29C 47/20* (2006.01)
(52) U.S. Cl. .............. 425/72.1; 425/326.1; 425/378.1
(58) Field of Classification Search ............... None
See application file for complete search history.

(56) References Cited

U.S. PATENT DOCUMENTS 3,059,277 A * 10/1962 Pierce et al. .............. 425/107
3,122,790 A * 3/1964 Albert ........................ 425/466
3,186,033 A * 6/1965 Newman, Jr. ............. 425/72.1
3,337,914 A * 8/1967 Corbett et al. ............. 425/191
3,349,437 A * 10/1967 Quackenbush .............. 425/462
3,422,493 A * 1/1969 Heston ..................... 425/326.1
3,471,899 A   10/1969 Ronden
3,539,666 A * 11/1970 Schirmer ..................... 264/51
3,599,286 A * 8/1971 Karet ........................ 425/464
3,841,816 A * 10/1974 Herz ....................... 425/326.1
3,902,832 A * 9/1975 Gregory et al. ............ 425/72.1
3,932,103 A * 1/1976 Rice ........................... 425/467
4,003,972 A   1/1977 Herz
4,069,282 A * 1/1978 Gutermuth et al. .......... 264/28
4,201,532 A * 5/1980 Cole .......................... 425/380
4,236,884 A   12/1980 Schott, Jr.
4,938,674 A * 7/1990 Liberman et al. .......... 425/72.1
5,069,612 A   12/1991 Teutsch et al.
5,538,411 A   7/1996 Gates
6,241,502 B1   6/2001 Baeumer et al.
6,533,570 B2   3/2003 Meyer
6,619,942 B2   9/2003 Meyer

FOREIGN PATENT DOCUMENTS

| DE | 100 01 363 | 7/2001 |
| DE | 100 48 862 | 12/2001 |
| EP | 0 626 247 | 5/1994 |
| EP | 0 873 846 | 10/1998 |
| GB | 1 253 454 | 11/1971 |

* cited by examiner

Primary Examiner—Mark Eashoo
(74) Attorney, Agent, or Firm—Jacobson Holman PLLC

(57) ABSTRACT

Tubular film die head for extruding single-layer or multi-layer film which has at least the following features: a substantially annular die gap, fastening elements which fix at least two components with respect to one another which together border areas bearing plastic melt within the tubular film die head, coolant-carrying elements. At least one part of the fastening elements is structured as coolant-carrying elements.

16 Claims, 5 Drawing Sheets

Section B-B

Section B-B

Section A-A

BLOWING HEAD FOR EXTRUDING FILMS, COMPRISING CLAMPING ELEMENTS CONTAINING DUCTS FOR COOLING AIR

This is a nationalization of PCT/EP03/00564 filed Jan. 21, 2003 and published in German.

BACKGROUND OF THE INVENTION

1. Field of the Invention

The present invention relates to a tubular film die head for extruding single-layer or multi-layer film having a substantially annular die gap, fastening elements which fix at least two components with respect to one another which together border areas bearing plastic melt within the tubular film die head, and coolant-carrying elements.

2. Description of the Related Art

The extruded tubular films find use in the packaging material industry, among others.

Tubular film die heads of the type cited are, for example, shown in EP 0 626 247 A1, U.S. Pat. No. 5,069,612, and in DE 100 01 363 A1. In all the tubular film die heads of this type there is the necessity of distributing plastic melt, which is conveyed in the lines, within the die head so that it reaches an annular die gap relatively uniformly. In this way the plastic melt is formed into a film tube.

Among other things, for reasons of manufacturing technology (of the die head), at least one part of the distribution process of the plastic melt is, as a rule, done by plastic melt-carrying areas which are bounded by at least two components. The aforementioned publications show that the geometric structure of these areas can be realized in the most varied forms.

Due to the substantial pressure which the melt is under, forces act on these components, often called lifting forces. Among other things, these forces must be absorbed by robust fastening elements which often have a not insignificant demand for volume.

After extrusion, the film tube is conveyed as a rule to a squeezing device and later to a reversing device. This state of affairs, such as the reel of the die head, squeezing roller, and reversing are known and represented by EP 0 873 846 A2, among others.

Due to this situation the film tube is closed from above and from the sides. Thus, for example, the intake and discharge of coolants, such as, for example, coolant air for the cooling of the interior of the tube, must be done through the die head. Since the lines for feeding the plastic melt, fastening elements, and electric lines for sensor and heating elements and the like must also be conducted through the die head, the design of the die head becomes extraordinarily complicated. In particular, U.S. Pat. No. 5,538,411 shows the complexity of the die head design. In this publication fastening elements as well as coolant lines are shown, among other things.

Often the arrangement of said lines is done at the expense of the height of the die head. However, the height should actually be kept very small in order to protect the plastic melt.

Thus, the publications U.S. Pat. No. 4,003,972, U.S. Pat. No. 3,471,899, and GB 1 253 454 shows die heads in each of which a fastening element with a coolant line is provided. The die head patented in DE 100 48 862 C2 is to be considered as a further development of this type of die head which comprises a fastening element in which two coolant lines are integrated. Due to these two integrated coolant lines such a fastening element assumes a significant volume.

SUMMARY OF THE INVENTION

Thus, the objective of the present invention consists of proposing a die head in which the volume of the die head is utilized more efficiently.

The objective is realized by a tubular film die head for extruding single-layer or multi-layer film which has at least an annular die gap, fastening means which fix at least two components with respect to one another which together border areas bearing plastic melt within the tubular film die head, where the fastening means are structured coolant-carrying elements, and in which a plurality of fastening elements structured as coolant-carrying elements are provided. A part of the fastening elements contains coolant intake lines and another part contains coolant discharge lines.

It is recommended to cover either the fastening means, the holes, or both elements with thermally insulating materials since the coolant should arrive as cool as possible through the significantly heated die head. As a rule at least air is used as coolant.

Teflon and, in given cases, ceramic materials, among others, come into consideration as insulating material. Since gases such as air, or even a vacuum, possess very good insulating properties, suitable cavities can also be provided. More particularly, in the areas of the holes in the die head, through which the fastening elements engage, cavities may be provided and/or the fastening elements and the inner walls of the holes can jointly form cavities in the die head.

In many die heads according to the state of the art the coolant air is conducted through lines which lie in the center of the die head. However, such an arrangement of the air lines prevents the feeding of the melt through melt lines which are often guided in the center of the die heads or at least branch from a central position as shown in FIGS. 1 to 5. The eccentric disposition, in particular of several fastening means, is to remedy this problem.

Advantageously, the fastening means have the form of a circular cylinder. The fastening means such as, in particular, the screws, systems of threaded bolts and nuts, and systems of screws and nuts can work in the fixation of the various components.

As already mentioned repeatedly, coolants, as a rule, flow through fastening elements according to the invention and are thus often less heated than the housing of the die head.

These circumstances can be utilized by the fastening elements being only loosely constrained in their mounting. If the die head in operation assumes a higher temperature than the fastening elements, it will (with the same, or a similar, coefficient of expansion) also expand more strongly than them so that the fastening elements are stretched out more strongly and, in given cases, develop their full fixation effect. Additional advantageous forms of embodiment and embodiment examples of the invention follow from the additional claims, the description of the object, and the drawings.

BRIEF DESCRIPTION OF THE DRAWINGS

The individual figures show

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
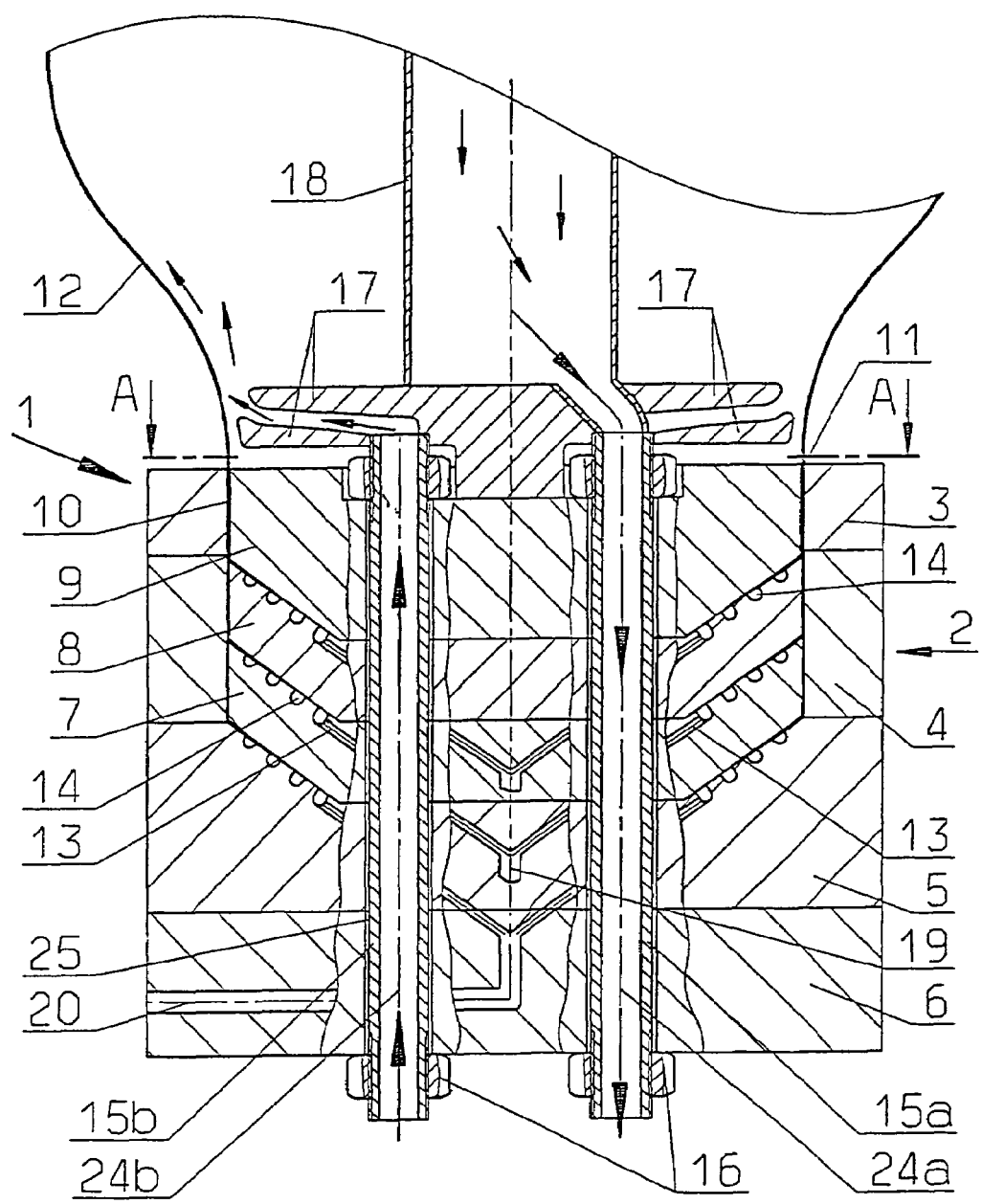
FIG. 1 a section through a die head along the line B—B from FIG. 2.

FIG. 1 shows a section through an embodiment example of a tubular film die head 1 according to the invention, the bearing end of said tubular film die head being the housing 2 which in turn consists of the external nozzle ring 3, the housing ring 4, the housing base plate 5, and the connecting plate 6. In the circular interior of the housing, above all, are located the two bars 7 and 8 as well as the inner nozzle ring 9. The components of the housing 2 and the aforementioned parts 4 to 6 bound an annular gap 10 through which the plastic melt reaches the die gap 11 and forms the film tube 12.

The plastic melt arrives in the aforementioned gap 10 through the feed lines 13. Before the mouth into the gap 10, the feed lines are realized as helical grooves 14 in the bars 7 and 8 as well as the housing base plate 5. In this case the helical grooves 14 are each bounded above by the component 7, 8, 9 which is located above the component 5, 7, 8 in which the grooves are introduced. Due to the high pressure which prevails in the feed lines during operation, great lifting forces act on the bars 7 and 8 and the inner nozzle ring 9, said forces having to be absorbed by the fastening means 15a and b.

The discharge of heated air is done by the stand pipe 18 and the fastening elements 15a which contain air exhaust pipes 24a.

Figure 2:
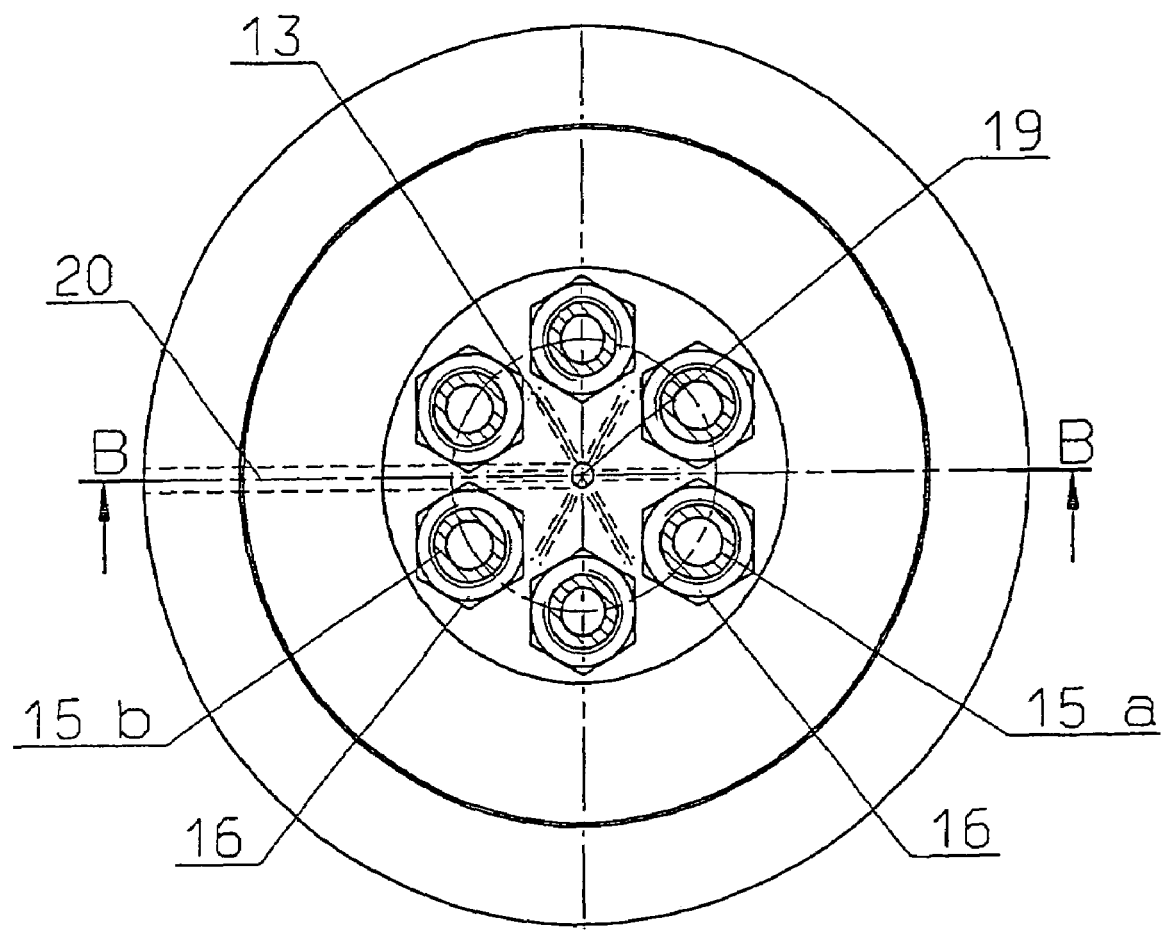
FIG. 2 a section along the line A—A from FIG. 1.

Worth mentioning in addition is the advantageous distribution of the plastic melt through branching points 19 which are disposed in the center of the die head, as can also be seen in FIG. 2. The melt is conveyed via the central feed lines 20.

Figure 3:
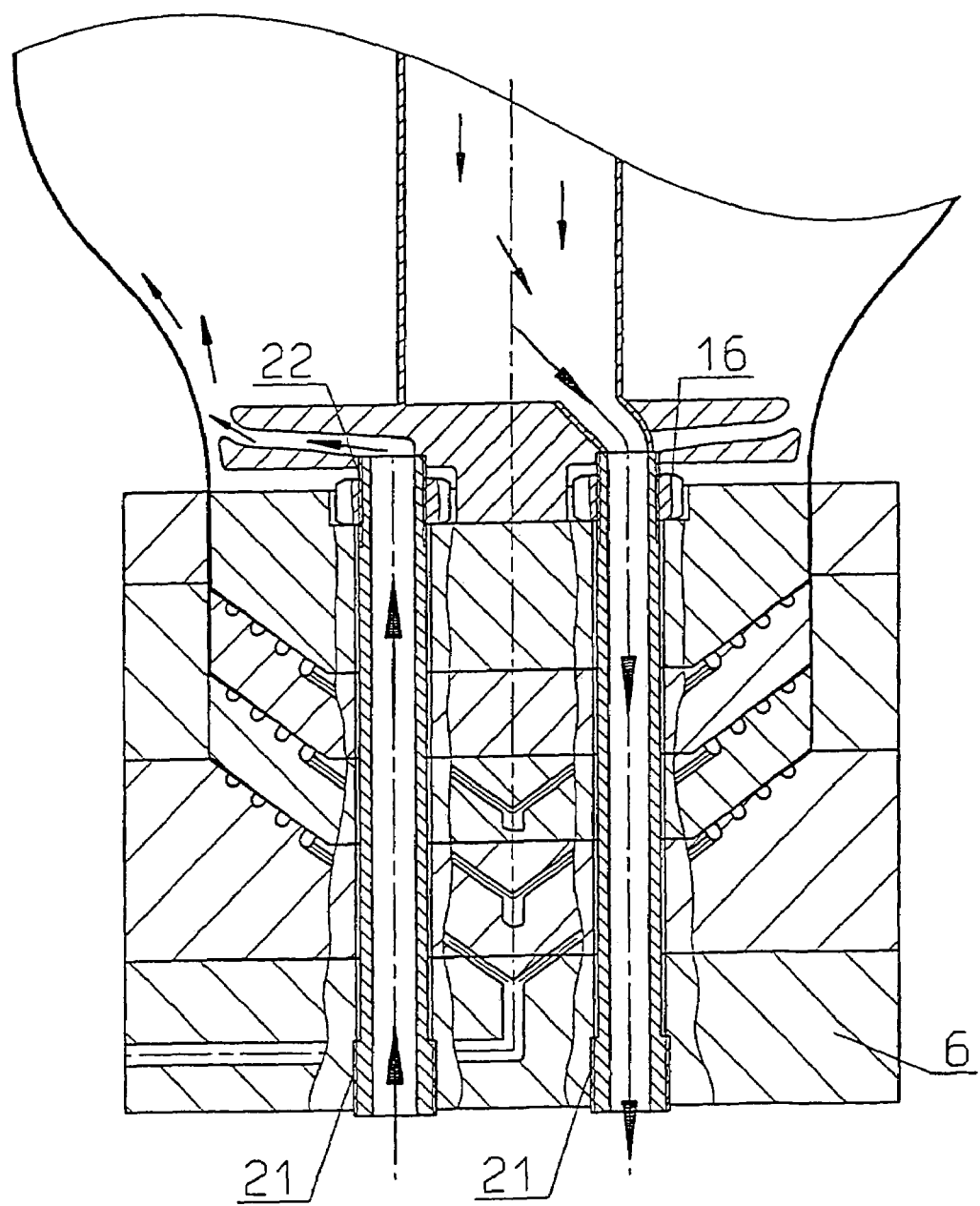
FIG. 3 a section through an additional embodiment example of the invention.
Figure 4:
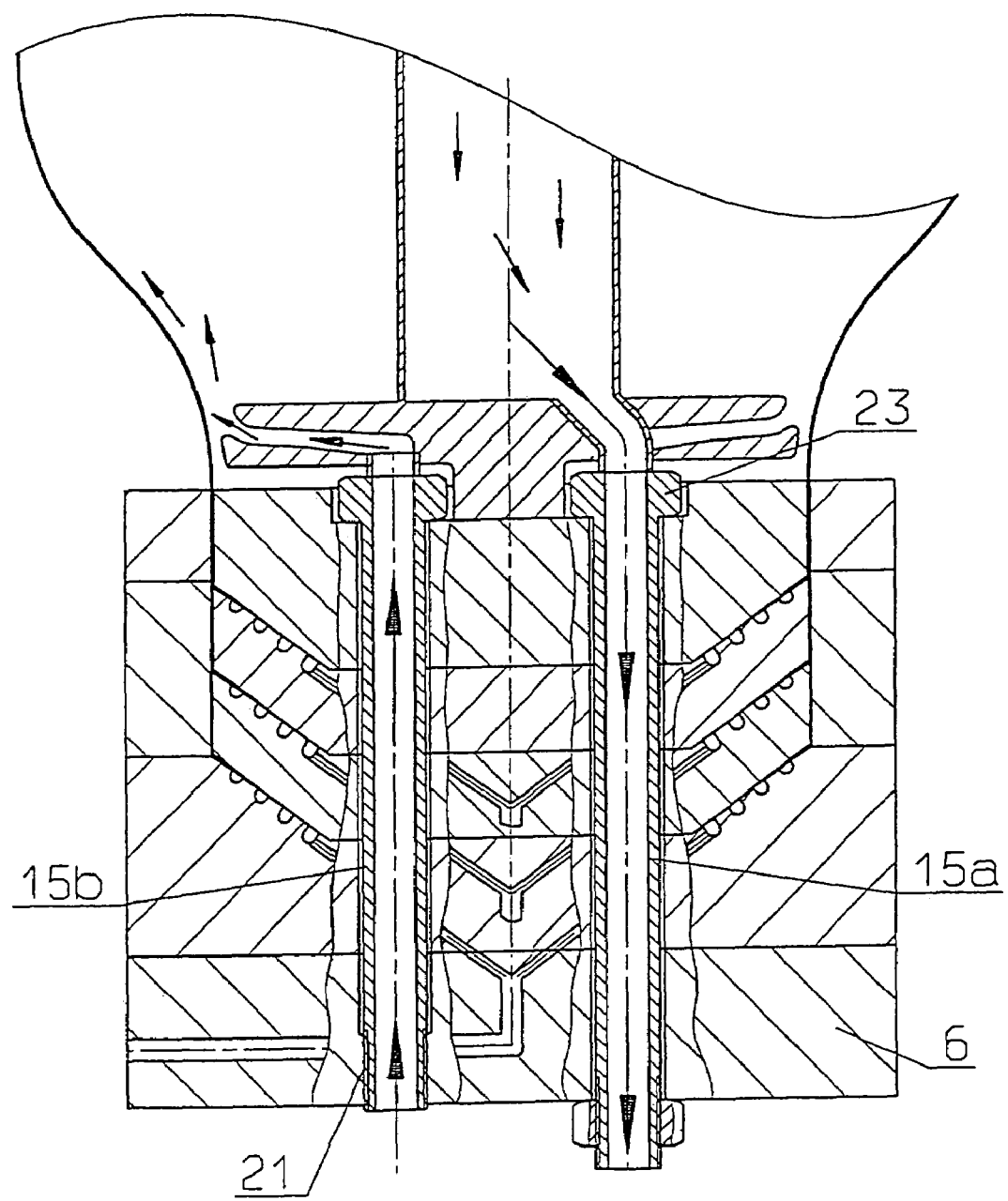
FIG. 4 a section through an additional embodiment example of the invention.
Figure 5:
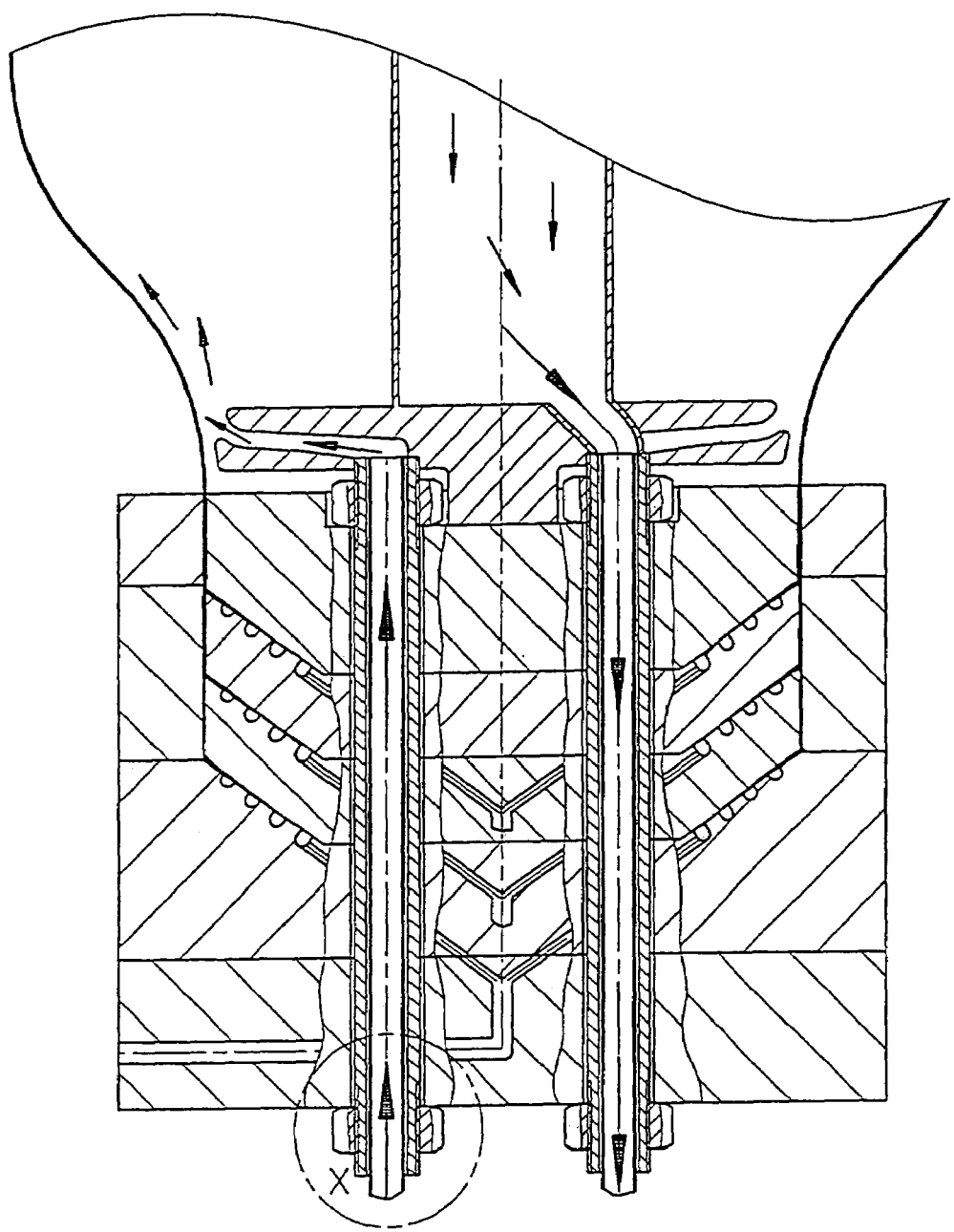
FIG. 5 a section through an additional embodiment example of the invention.
Figure 5:
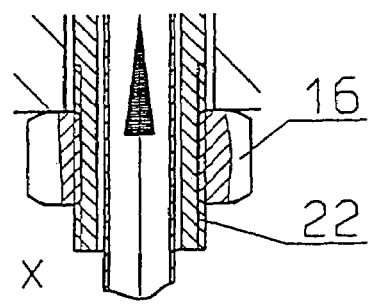

FIGS. 3 to 5 show different possibilities for constraining the fastening elements 15. In FIG. 3 the lower part of the hole for the fastening elements in the connecting plate 6 is provided with an inner thread 21 in which the outer thread 22 of the fastening elements 15 engages. The upper ends of the fastening elements 15 are once again provided with outer threads 22 and nuts 16. Often it is advantageous to provide the upper part of the hole for the fastening elements with a thread and to screw the fastening element into said thread. However, graphical representation of this form of embodiment was omitted.

In FIG. 4 heads 23 assume the role of the latter nuts 16. The fastening of the lower ends of the fastening elements 15b is done once again by screwing the same 15b to the connecting plate 6. The fastening elements 15a again have a nut at this point. FIG. 5 illustrates once more the fastening of the fastening elements with the nuts 16.

In the shown embodiment examples of the invention each fastening element 15 contains a line 24. However, it is just as well conceivable that fastening elements contain an exhaust line 24a and an intake line 24b. Other fastening elements can also get by without such lines 24. The holes, through which the fastening elements engage, may be encased, at least in part, with a thermally insulating material 25. The fastening elements may also consist, at least in part, of a thermally insulating material 25 and/or may contain cavities.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A tubular film die head for extruding single-layer or multi-layer film, comprising:
    an annular die gap; and
    at least two fastening elements having coolant-carrying capability, said fastening elements passing through holes in said die head and fixing at least two components which together border areas bearing plastic melt within the tubular film die head against one another, at least one of said fastening elements having a coolant intake line formed therein and at least one of said fastening elements having a coolant discharge line formed therein, said fastening elements being loosely constrained in said holes between opposite ends of said fastening elements, coolant running through said coolant lines resulting in said die head having a higher temperature during operation than a temperature of said fastening elements, said die plate at said higher temperature expanding more than said fastening elements to increase a force exerted by said fastening elements in fixing said components together.

2. The tubular film die head according to claim 1, wherein the holes through which the fastening elements are engaged are encased, at least in part, with a thermally insulating material.

3. The tubular film die head according to claim 1, wherein cavities are provided in areas of the holes in the die head through which the fastening elements are engaged.

4. The tubular film die head according to claim 1, wherein in areas of the holes in the die head through which the fastening elements are engaged, the fastening elements and inner walls of the holes jointly form cavities in the die head.

5. The tubular film die head according to claim 1, wherein the fastening elements are disposed eccentrically in the die head.

6. The tubular film die head according to claim 1, wherein the fastening elements clamp down an inner nozzle ring, bars, and a connecting plate and fix them with respect to one another.

7. The tubular film die head according to claim 1, wherein the fastening elements clamp down all the components which border the melt-carrying areas.

8. The tubular film die head according to claim 1, wherein the fastening elements include, at least in part, a thermally insulating material.

9. The tubular film die head according to claim 1, wherein each of said fastening elements is cylindrical.

10. The tubular film die head according to claim 1, wherein each of the fastening elements is provided with a head at one end and outer threads at an opposite end thereof, said opposite end being engaged with a correspondingly threaded nut when said fastening element is mounted and fixing said components together.

11. The tubular film die head according to claim 1, wherein the fastening elements are bolts or screws.

12. A process for the mutual fixation of at least two components which together border areas carrying plastic melt within the tubular film die head, comprising the steps of:
- fixing a first fastening element having a head and an opposite threaded end through at least two components which together border areas carrying plastic melt, said first fastening element including a coolant carrying intake line formed therein;
- fixing a second fastening element having a head and an opposite threaded end through said at least two components, said second fastening element including a coolant carrying discharge line formed therein;
- securing said threaded ends with at least one separate correspondingly threaded component so that said fastening elements are loosely constrained; and
- conducting coolant through said fastening elements so that the contact force of the at least two components against one another is increased when said components heat up and expand more during the extrusion process than the fastening elements which are being cooled by said coolant.

13. The process according to claim 12, wherein said step of securing said threaded ends includes screwing a correspondingly threaded nut onto each threaded end.

14. A tubular film die head for extruding single-layer or multi-layer film, comprising:
- an annular die gap;
- die head components including an inner nozzle ring, two bars, and a connecting plate which border areas bearing plastic melt within the tubular film die head;
- at least two fastening elements each having a head, an opposite threaded end and coolant-carrying capability, said fastening elements passing through said inner nozzle ring, bars, and connecting plate, said fastening element heads abutting against said inner nozzle ring and said threaded ends protruding from said connecting plate and being engaged with a correspondingly threaded component to fix said ring, bars and plate against one another, at least one of said fastening elements having a coolant intake line formed therein and at least one of said fastening elements having a coolant discharge line formed therein; and
- said fastening elements and said components being configured so that coolant conducted through said coolant intake line and said coolant discharge line of said fastening elements increases the contact force of the components against one another due to the fact that said components heat up and expand more during the extrusion process than the fastening elements which are being cooled by said coolant flowing therethrough.

15. The tubular film die head according to claim 14, wherein the fastening elements include, at least in part, a thermally insulating material.

16. The tubular film die head according to claim 14, wherein said correspondingly threaded component includes a nut fitted to each fastening element.

* * * * *